(12) United States Patent
Chen et al.

(10) Patent No.: US 8,880,493 B2
(45) Date of Patent: *Nov. 4, 2014

(54) MULTI-STREAMS ANALYTICS

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,947

(22) Filed: Sep. 28, 2011

(65) Prior Publication Data

US 2013/0080413 A1  Mar. 28, 2013

(51) Int. Cl.
*G06F 7/00* (2006.01)
*G06F 17/30* (2006.01)

(52) U.S. Cl.
CPC .... *G06F 17/30516* (2013.01); *G06F 17/30584* (2013.01)
USPC .......................................... 707/706; 707/826

(58) Field of Classification Search
None
See application file for complete search history.

(56) References Cited

U.S. PATENT DOCUMENTS

| | | | |
|---|---|---|---|
| 5,655,117 A * | 8/1997 | Goldberg et al. ..................... 1/1 |
| 6,910,032 B2 | 6/2005 | Carlson et al. |
| 6,947,933 B2 | 9/2005 | Smolsky |
| 7,310,638 B1 | 12/2007 | Blair |
| 7,315,923 B2 | 1/2008 | Retnamma |
| 7,318,075 B2 | 1/2008 | Ashwin et al. |
| 7,403,959 B2 | 7/2008 | Nishizawa et al. |
| 7,412,481 B2 | 8/2008 | Nicholls et al. |
| 7,673,065 B2 | 3/2010 | Srinivasan |
| 7,739,265 B2 | 6/2010 | Jain et al. |
| 7,860,884 B2 | 12/2010 | Lee et al. |
| 7,861,050 B2 | 12/2010 | Retnamma et al. |
| 7,991,766 B2 | 8/2011 | Srinivasan et al. |
| 8,010,512 B2 | 8/2011 | Koyanagi et al. |
| 8,224,622 B2 * | 7/2012 | Kumar et al. .................. 702/179 |
| 2007/0005579 A1 | 1/2007 | Grewal et al. |
| 2007/0288635 A1 | 12/2007 | Gu et al. |
| 2008/0016095 A1 * | 1/2008 | Bhatnagar et al. ............ 707/101 |
| 2008/0120283 A1 | 5/2008 | Liu et al. |
| 2008/0133446 A1 * | 6/2008 | Dubnicki et al. .................. 707/1 |
| 2008/0281913 A1 * | 11/2008 | Shankar et al. ............... 709/204 |
| 2009/0063533 A1 * | 3/2009 | Ting .............................. 707/102 |
| 2009/0106214 A1 * | 4/2009 | Jain et al. ........................... 707/4 |
| 2009/0112802 A1 | 4/2009 | Srinivasan et al. |
| 2009/0228434 A1 * | 9/2009 | Krishnamurthy et al. ........ 707/2 |
| 2009/0271529 A1 | 10/2009 | Kashiyama et al. |
| 2009/0287628 A1 | 11/2009 | Indeck et al. |
| 2009/0287725 A1 * | 11/2009 | von Praun ..................... 707/101 |
| 2009/0327257 A1 | 12/2009 | Abouzeid et al. |
| 2010/0088274 A1 | 4/2010 | Ahmed et al. |
| 2010/0232286 A1 * | 9/2010 | Takahashi et al. ............. 370/216 |
| 2010/0318495 A1 | 12/2010 | Yan et al. |

(Continued)

OTHER PUBLICATIONS

Continuous MapReduce for In-DB Stream Analytics, Chen et al., OTM 2010 Workshops, LNCS 6428, pp. 16-34, 2010.*

(Continued)

*Primary Examiner* — Augustine K Obisesan

(57) ABSTRACT

Multi-stream analytics is disclosed. An example method of multi-stream analytics with a query engine includes punctuating unbounded streaming data into data chunks, each of the data chunks representing a bounded data set in the unbounded streaming data. The method also includes processing one of the data chunks. The method also includes rewinding a query instance for processing another of the data chunks.

20 Claims, 4 Drawing Sheets

(56) References Cited

U.S. PATENT DOCUMENTS

| | | | |
|---|---|---|---|
| 2011/0016160 | A1 | 1/2011 | Zhang et al. |
| 2011/0060890 | A1 | 3/2011 | Tanaka et al. |
| 2011/0119262 | A1 | 5/2011 | Dexter et al. |
| 2011/0125778 | A1 | 5/2011 | Kubo |
| 2011/0196856 | A1 | 8/2011 | Chen et al. |
| 2011/0302151 | A1* | 12/2011 | Abadi et al. .................. 707/714 |
| 2011/0314019 | A1* | 12/2011 | Jimenez Peris et al. ...... 707/737 |
| 2012/0078951 | A1* | 3/2012 | Hsu et al. ...................... 707/769 |
| 2012/0166417 | A1* | 6/2012 | Chandramouli et al. ..... 707/713 |

OTHER PUBLICATIONS

Models and Issues in Data Stream Systems, Babcock et al., ACM PODS 2002, Jun. 3-6, 2002.*
Semantics and Evaluation Techniques for Window Aggregates in Data Streams, Li et al., ASM SIGMOD 2005, Jun. 14-16, pp. 311-322, 2005.*
Stream processing in data-driven computational science, Liu et al., Grid Computing Conference, pp. 160-167, 2006.*
A Native Extension of SQL for Mining Data Streams, Luo et al., SIGMOD 2005 Jun. 14-16, 2005, pp. 873-875, 2005.*
Grid-Based Subspace Clustering over Data Streams, Park et al., CIKM'07, Nov. 6-8, pp. 801-810, 2007.*
State-Slice: New Paradigm of Multi-query Optimization of window-based Stream Queries, Wang et al., VLDB'06, Sep. 12-15, pp. 619-630, 2006.*
Continuous nearest neighbor queries over sliding windows, Mouratidis et al, IEEE transactions on knowledge and data engineering, 19(6), pp. 789-803, Jun. 2007.*
Calder Query Grid Service: Insights and Experimental Evaluation, Vijayakumar et al, Proceedings of the sixth IEEE International Symposium on CLuster Computing and the Grid (CCGRID'06), 2006.*
A stream database server to sensor application, Hammad et al, Computer science technical reports, 2002.*
Query processing for streaming sensor data, Madden et al, computer science division, 2002.*
Sream Window Join: Tracking Moving Objects in Sensor-Network Databases, Hammad et al, Proceedings of the 15th International COnference of Scientific and Statistical Database Management (SSDBM'03), 2003.*
Separation Results on the "One-More" Computational Problems, Bresson et al, Lecture Notes in Computer Science vol. 4964, pp. 71-87, 2008.*
Black, Damian, Relational Asynchronous Messaging: A New Paradigm for Data Management and Integration, Jan. 2007.
SQL Stream, Query the Future SQLStream's RAMMS Solutions and Applications, 2009, SQL Stream Incorporated.
Arasu, A., Babu, S., Widom, J. The CQL Continuous Query Language: Semantic Foundations and Query Execution. VLDB Journal, (15)2, Jun. 2006.
D. J. Abadi et al. The Design of the Borealis Stream Processing Engine. In CIDR, 2005.
R E Bryant. "Data-Intensive Supercomputing: The case for DISC", CMU-CS-07-128, 2007.
Chaiken, B. Jenkins, P-Å. Larson, B. Ramsey, D. Shakib, S. Weaver, J. Zhou, "SCOPE: Easy and Efficient Parallel Processing of Massive Data Sets", VLDB 2008.
Qiming Chen, Meichun Hsu, Hans Zeller, "Experience in Continuous analytics as a Service", EDBT 2011.
Qiming Chen, Meichun Hsu, "Experience in Extending Query Engine for Continuous Analytics", Proc. 11th Int. Conf. DaWaK, 2010.
Qiming Chen. Meichun Hsu, "Cooperating SQL Dataflow Processes for In-DB Analytics", Proc. 17th International Conference on Cooperative Information Systems (CoopIS), 2009.
Qiming Chen, Meichun Hsu, "Inter-Enterprise Collaborative Business Process Management", Proc. of 17th Int'l Conf on Data Engineering (ICDE), 2001.
D.J. DeWitt, E. Paulson, E. Robinson, J. Naughton, J. Royalty, S. Shankar, A. Krioukov, "Clustera: An Integrated Computation And Data Management System", VLDB 2008.
Michael J. Franklin, et al, "Continuous Analytics: Rethinking Query Processing in a Network—Effect World", CIDR 2009.
Lyon, E. et al. "Scheduling of Continuous Queries Over Data Streams Onto Parallel Platforms", no publication date given; available on the Internet at least as early as Jul. 26, 2011.
Bugra Gedik, Henrique Andrade, Kunz-Lung Wu, Philip S. Yu, Myung Cheol Doo, "SPADE: The System S Declarative Stream Processing Engine", ACM SIGMOD 2008.
Erietta Liarou et. al."Exploiting the Power of Relational Databases for Efficient Stream Processing", EDBT 2009.
Junyi Xie , Jun Yang, "a survey of join processing in data streams", In Chapter 10, "Data Stream: Models and Algorithms" 2007.
Krishnamurthy, et al. "Continuous Analytics Over Discontinuous Streams" 2010.

* cited by examiner

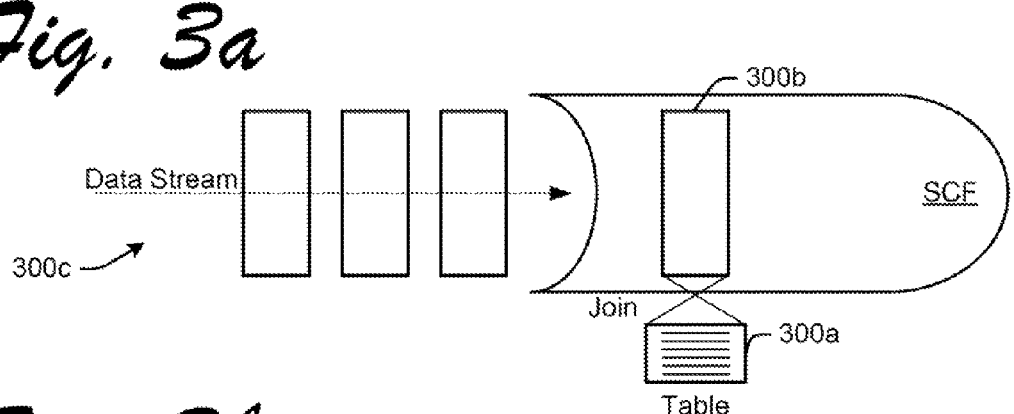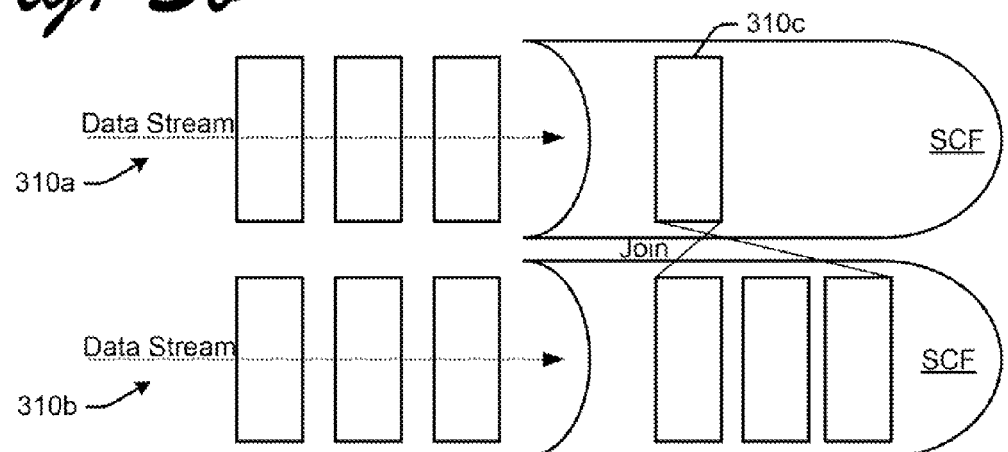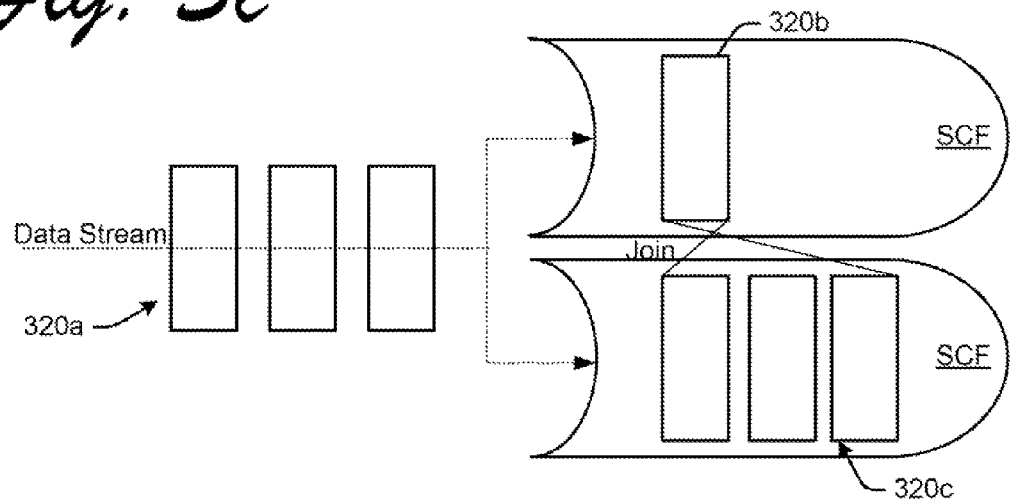

MULTI-STREAMS ANALYTICS

BACKGROUND

There are many sources of data, including for example, weather data, temperature data, network traffic data, and automobile traffic data. Analyzing this data in real time can provide valuable insight to various situations, including but not limited to the ability to predict and prevent failures, choose alternatives, and enhance user experiences. Due to the ever increasing volume of data that is available for analysis, and the desire to deliver faster data processing for real-time applications, continuous data analysis is pushing the limits of traditional data warehousing technologies. Data Stream Management Systems (DSMS) provide a paradigm shift from the load-first analyze-later mode of data warehousing by processing more efficiently than disk based data processing systems.

Current generation DSMS lacks the functionality offered by the structured query language (SQL) and Database Management Systems (DBMS). That is, an SQL query is definable only on bounded and finite data, but streaming data is unbounded and infinite. But because a stream query is defined on unbounded data, and in general is limited to non-transactional event processing, the current generation DSMS is typically constructed independent of the database engine. Separating the DSMS and query engine platforms result in higher overhead for accessing and moving data. Managing data-intensive stream processing outside of the query engine causes fails to leverage the full SQL and DBMS functionality.

While some analytical systems purport to offer a "continued query" mode, these systems are based on automatic view updates and therefore not really supporting continuous querying. Other systems leverage database technology, but are characterized by providing a workflow-like service for launching a one-time SQL query to buffered data stream sets iteratively in a non-dataflow fashion.

BRIEF DESCRIPTION OF THE DRAWINGS

FIGS. 3a-c illustrate example join operations.

DETAILED DESCRIPTION

Figure 1:
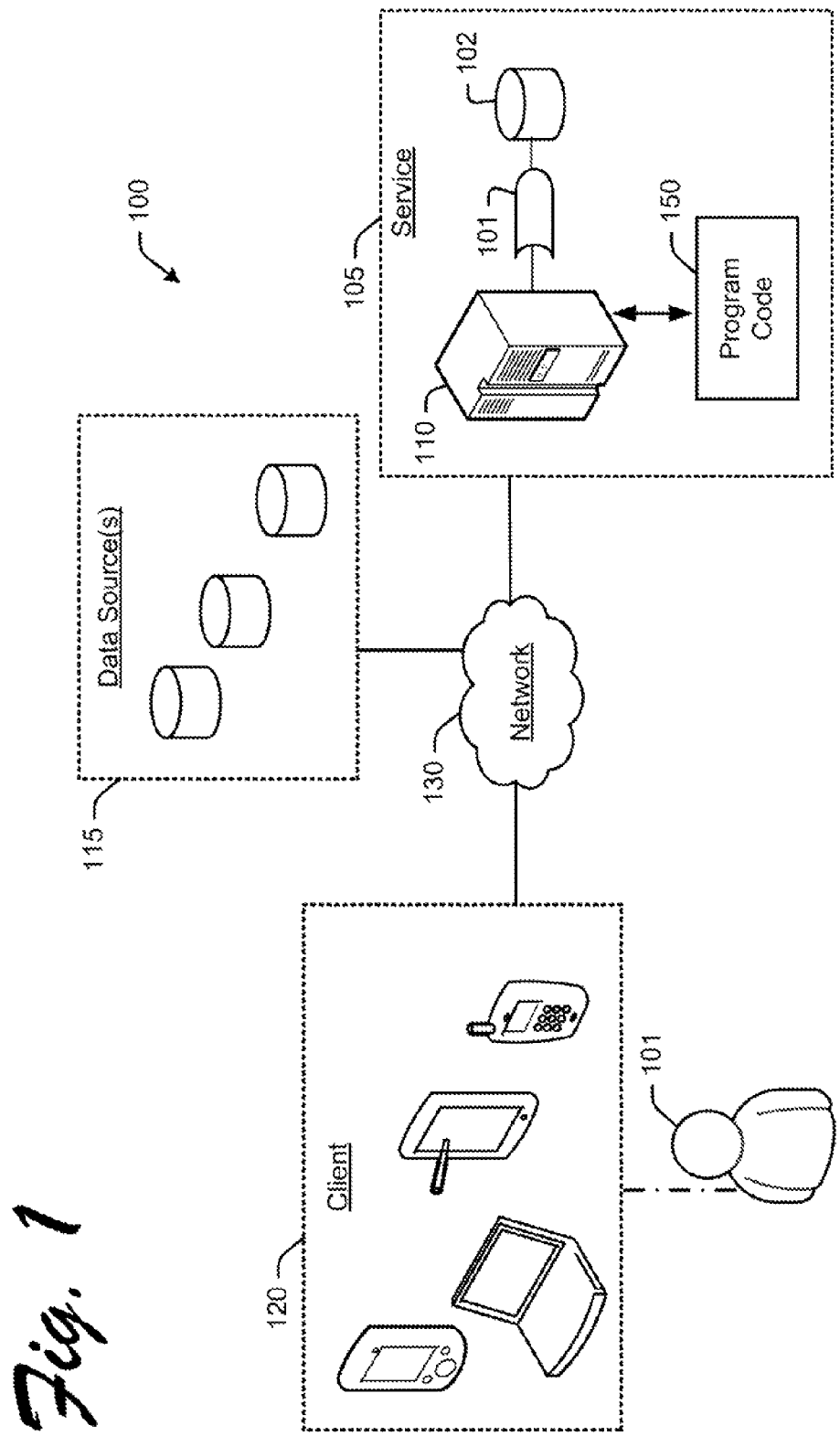
FIG. 1 is a high-level illustration of an example networked computer system which may be implemented for multi-stream analytics.

The ever increasing volume of data and the demand for faster and more efficient processing of real-time, continuous data streams makes new data analysis techniques desirable. The techniques described herein enable multi-stream analytics. An example system uses query engines to leverage the expressive power of SQL, the streaming functionality of query processing, and in general, the vast array of available database technologies.

A pipelined query engine can be thought of as a streaming engine, and therefore query processing can be leveraged for continuous stream analytics. But the fundamental difference between the two is that a query is traditionally defined on bounded relations, while data stream is unbounded. Joining multiple streams is a stateful (thus history-sensitive) operation. But a SQL query works on the current state. In addition, joining relations typically is by relation re-scan in a nested-loop. But by its very nature, a stream cannot be recaptured, because reading a stream in real time retrieves new incoming data.

Therefore, the program code described herein executes an extended SQL model that unifies queries over both streaming and stored relational data, and the query engine is extended for integrating stream processing and DBMS. In an example, a Cycle based Continuous Query (CCQ) model is defined. The CCQ model enables an SQL query to be executed on a cycle-by-cycle basis for processing the data stream in a chunk-by-chunk manner, without shutting the query instance down between execution cycles. This helps maintain continuity of the application state across execution cycles for history-sensitive operations (e.g., sliding-window operations).

For joining multiple streams, the approach described herein further includes buffering one or more consecutive data chunks falling in a sliding window across query execution cycles in the CCQ instance, to allow redelivery in subsequent re-scans. In this way multiple streams can be joined, and a single stream can be "self-joined" in a data chunk-based window or sliding window, with various pairing schemes.

Accordingly, the approach described herein may be implemented to unify query processing over both stored relations and dynamic streaming data. In an example, these capabilities are provided using the PostgreSQL engine to support truly continuous, yet cycle-based query execution. In addition, the user defined function (UDF) framework may be used to buffer data across query execution cycles. The systems and methods thus enable handling of multiple streams using an SQL query, in addition to being readily scaled and efficient.

In addition, by leveraging SQL's expressive power and the query engine's data processing capability for continuous analytics involving one or more input streams, the techniques described herein provide a continuous, long-standing query instance that handles per-tuple processing, maintains application state continuously, and supports granular analysis semantics in combination.

Before continuing, it is noted that as used herein, the terms "includes" and "including" mean, but is not limited to, "includes" or "including" and "includes at least" or "including at least." The term "based on" means "based on" and "based at least in part on."

FIG. 1 is a high-level block diagram of an example networked computer system 100 which may be implemented for multi-stream analytics. System 100 may be implemented with any of a wide variety of computing devices. A computing device is defined as including at least some memory, storage, and at least a degree of data processing capability sufficient to execute the program code described herein, e.g., a query function 101 using a query engine 102.

In an example, the system 100 may include a host 110 providing a service 105 which may be accessed by a user 101 via a client device 120 (e.g., personal computer or other electronics device such as a tablet) over a communication network 130. For purposes of illustration, the service 105 may be a data processing service executing on the host 110. Example services may include general purpose computing services (e.g., processing enterprise and/or other sources of data sets provided via the Internet or as dynamic data endpoints for any number of client applications). Services also include interfaces to application programming interfaces (APIs) and related support infrastructure.

Although, it is noted that the operations described herein may be executed by program code 150 residing on the client 120, the data processing operations may be better performed on a separate computer system having more processing capability, such as a server computer or plurality of server computers (i.e., the host 110). It is also noted that the service 105 may be a cloud-based service, wherein the program code is executed on at least one local computing device, but also has access to the service 105 in the cloud computing system.

The service 105 may include access to at least one data source 115. The data source may be local and/or remote. That is, the data source 115 may be part of the service 105, and/or the data source 115 may be physically distributed in the network and operatively associated with the service 105. The data source 115 may include any type and/or amount of data. In the examples described herein, the data is streaming data (i.e., continuously arriving data). For example, the data source 115 may include data providing information about network traffic, automobile traffic, weather, and any of a wide variety of other types of streaming data. There is no limit to the type or amount of data that may be provided. In addition, the data may include unprocessed or "raw" data, or the data may undergo at least some level of processing.

In an example, the program code 150 may be implemented in machine-readable instructions (such as but not limited to, software or firmware). The machine-readable instructions may be stored on a non-transient computer readable medium and are executable by one or more processor to perform the operations described herein.

Before continuing, it should be noted that the example devices and operating environment described above are provided for purposes of illustration, and are not intended to be limiting. Other devices and/or device configurations may be utilized to carry out the operations described herein.

As mentioned above, the program code may be executed by any suitable computing device for multi-stream analytics of data provided by data source 115. Example program code 150 used to implement features of the system can be better understood with reference to the following operations.

The difficulty of using traditional SQL queries for processing data streams is that an SQL query is not definable on unbounded data and cannot return a complete result. If the query involves aggregation, the query engine never returns any result. Instead, the program code 150 described herein "cuts" the data stream into a sequence of "chunks," with each chunk representing a bounded data set on which a query is definable.

In general, given a query (Q) over a set of relation tables $(T_1, \ldots T_n)$, and an infinite stream of relation tuples (S) with a criterion ($\theta$) for cutting S into an unbounded sequence of chunks. For example, a 1-minute time window may be used such that the $<s_0, s_1, \ldots s_i, \ldots>$ where $s_i$ denotes the i-th "chunk" of the data stream according to the chunking-criterion ($\theta$). Then $s_i$ can be interpreted as a bounded relation. The semantics of applying the query (Q) to the unbounded stream of relation tuples (S) plus relation tables $(T_1, \ldots T_n)$ lies in the following expression:

$$Q(S, T_1, \ldots T_n) \rightarrow <Q(s_0, T_1, \ldots T_n), \ldots Q(s_1, T_1, \ldots T_n), \ldots>$$

This expression continuously generates a sequence of query results, one on each chunk of the data stream. To implement this model on a query engine, a query captures stream elements on-the-fly, to punctuate the input data stream into chunks, to run cycle-by-cycle for processing the stream chunk-by-chunk, while maintaining continuity of the query instance for retaining the buffered data for history-sensitive applications (e.g., sliding window applications).

Accordingly, a stream capture function may be defined. Events are captured from streams and converted to relation data to fuel continuous queries. The first step is to replace the database table, which contains a set of tuples on disk, by a different type of table function, referred to herein as a Stream Capture Function (SCF). The SCF returns a sequence of tuples to feed queries without first storing those tuples on disk. In the other words, a table scan is replaced by a by function scan. The SCF can listen or read data and events sequence, and generate stream elements continuously on a tuple-by-tuple basis. The SCF can be called multiple times during the execution of a continuous query. Each call returns one tuple to fuel the query.

It is noted that fueling the query on a tuple-by-tuple basis upon receipt of an incoming event is not the same as a traditional function-scan. To the contrary, the traditional function-scan first provides all the output tuples, and then delivers those one by one. This can result in significant latency, and is semantically inconsistent with unbounded nature of a data stream.

The SCF scan is supported at two levels: (1) the SCF level, and (2) the query executor level. A data structure containing function call information bridges these two levels. The function call is initiated by the query engine and passed in/out of the SCF for exchanging function invocation related information. This mechanism minimizes the code change and maximizes the extensibility of the query engine.

In addition, UDFs may be used to add window operators and other history sensitive operators, buffering raw data or intermediate results within the UDF closures. A UDF is called multiple times following a FIRST_CALL, NORMAL_CALL and FINAL_CALL skeleton. The data buffers are initiated in the FIRST_CALL, and used in each NORMAL_CALL. The query engine is extended to allow such "multi-call-process" of a table function to span multiple input tuples as a scalar function, as will be described in more detail below.

Briefly, a window UDF incrementally buffers the data stream, and manipulates the buffered data chunk for the window operation. Although the CQ runs cycle-by-cycle for processing data stream chunk-by-chunk, the query instance remains active. Thus, the UDF buffer is retained between cycles of execution, and the data states are traceable continuously. In addition, the static data retrieved from the database can be loaded in a window operation initially, and then retained in the entire long-standing query.

To apply the CQ to unbounded data streams on a chunk-by-chunk basis, while maintaining the query instance without shutdown/restart, the input data stream may be cut into a sequence of chunks. Each chunk represents a bounded data set on which a query is definable. After processing a chunk of data, the query instance is "rewound" for processing the next chunk of data. That is, when the end-of-cycle event or condition is signaled from the SCF, the query engine completes the current query execution cycle, then rewinds the query instance for the next execution cycle. As such a CQ is running cycle-by-cycle, and is refer to herein as Cycle-based CQ (CCQ).

Figure 2A:
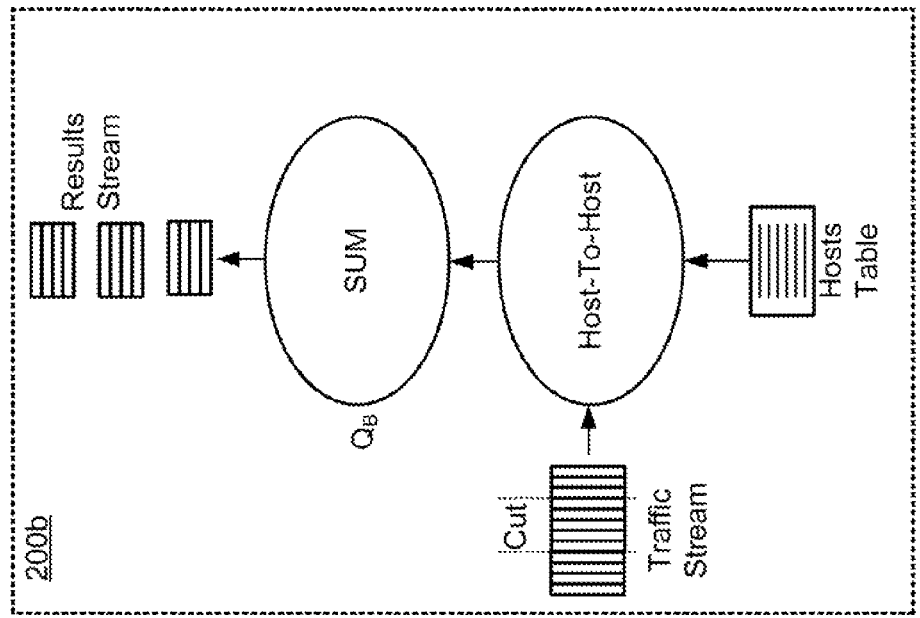
FIGS. 2a-b illustrate application of (a) a query to a static (bounded) data set, such as tables, and (b) a continuous query cycle-by-cycle for processing a data stream chunk-by-chunk.
Figure 2B:
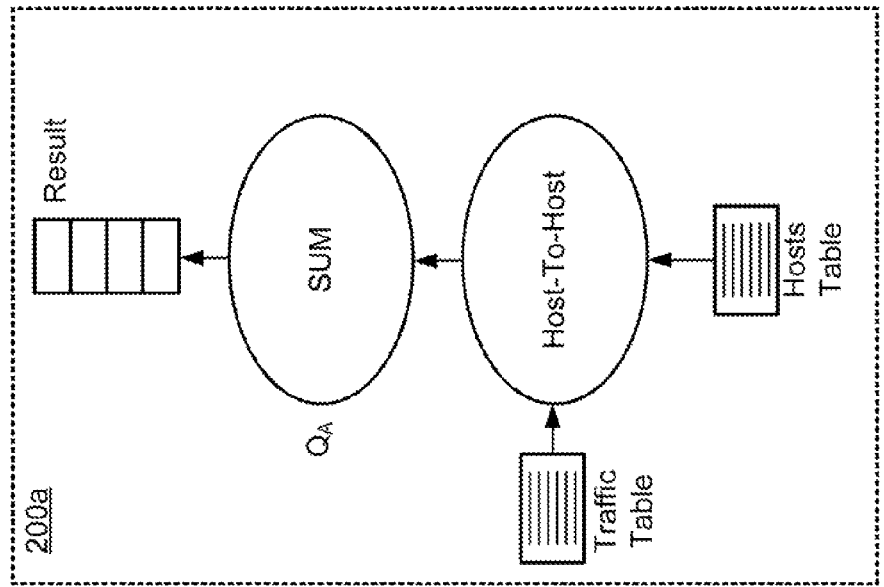

An example is illustrated below with reference to FIGS. 2a-b. FIGS. 2a-b illustrate application of (a) a query to a static (bounded) data set, such as tables, and (b) a continuous query cycle-by-cycle for processing a data stream chunk-by-chunk. In this example, a stream of network traffic packets has the following schema [pid, $t_s$, from-ip, to-ip, bytes, . . . ], where pid is the identification of the packet, and $t_s$ is the source timestamp. It is noted that according to the TCP protocol, the stream of TCP/IP packets transmitted from a source to a destination should arrive in the order of their source timestamps.

Querying may be implemented to capture data related to IP-to-IP network traffic, convert the data to host-to-host traffic, and then measure the traffic volume between each pair of hosts. The mapping from IP to host is given in the hosts_table. In the first example 200a illustrated by FIG. 2a, a one-time query defined on a bounded snapshot of the traffic flow is stored in the traffic table "traffic_table". This table is bounded, and so the query result involving aggregation (SUM) is well defined.

In the second example 200b illustrated by FIG. 2b, a query ($Q_B$) may be applied to the unbounded data stream generated using SCF. The SCF receives a packet stream from a socket, and generates and delivers packet tuples to fuel the stream query. The stream is unbounded, but is punctuated to bounded per-minute chunks for processing. The query derives the host-to-host traffic volumes on a minute-by-minute basis, as shown below:

---
[Cycle-based Continuous Query: $Q_B$]
---
SELECT floor(S.$t_s$/60) AS minute, h1.host-id AS from-host, h2.host-id AS to-host, SUM(S.bytes)
    FROM STREAM_get_packets(packet_stream, 'CUT ON $t_s$
       BY 60 SECS')) S, Hosts h1, Hosts h2
    WHERE h1.ip = S.from-ip AND h2.ip = S.to-ip
    GROUP BY minute, from-host, to-host.
---

In the above query ($Q_B$), the disk-resided database table is replaced by the SCF, STREAM_get_packets (packet_stream, 'CUT ON ts BY 60 SECS'). Here, the term "packet_stream" is the stream source, and the term "'CUT ON ts BY 60 SECS'" expresses the chunking criterion specifying that the stream source is to be "cut" into a sequence of bounded chunks every 60 seconds (1 minute chunks). The execution of the query ($Q_B$) on an infinite stream is made in a sequence of cycles, one on each data chunk. In this way, the query ($Q_B$) returns a sequence of chunk-wise query results.

To support cycle based query execution for chunk-wise data processing, a cut-and-rewind query execution mechanism may be implemented. That is, a query execution is "cut" based on the cycle specification, and then the state of the query rewinds (without shutting down) for processing the next chunk of data stream in the next cycle.

The "cut" originates in the SCF at the bottom of the query tree. The SCF has a general form of STREAM(SS, cycle-spec), which specifies that the stream source SS is to be "cut" into an unbounded sequence of chunks. The "cut point" is specified in the cycle-spec. Upon detection of an end-of-cycle condition, the SCF signals end-of-cycle punctuation to the query engine, resulting in termination of the current query execution cycle.

In general, the end-of-cycle is determined when the first stream element belonging to the next cycle is received. Then that element is cached to be processed first in the next cycle.

Upon termination of an execution cycle, the query engine does not shut down the query instance, but instead rewinds the query instance for processing the next chunk of data stream. Rewinding a query is a top-down process along the query plan instance tree, with specific treatment on each node type. In general, the intermediate results of the SQL operators (associated with the current chunk of data) are discarded. But the application context is maintained in the UDFs (e.g., for handling sliding windows). Because the query instance remains "alive" across cycles, data for sliding-window oriented, history sensitive operations can proceed in an ongoing basis.

Multiple common chunking criteria can be supported for punctuating a stream, including chunking by cardinality, i.e. the number of inputs; chunking by input range, e.g. by time-window; and chunking by "object" based on the chunk-key attribute (e.g., the identification of a graph appearing in multiple consecutive stream elements).

In addition, a cycle-based transaction model can be coupled with the cut-and-rewind query model to "commit" a stream query one cycle at a time in a sequence of "micro-transactions." This approach makes the per-cycle stream processing results visible as soon as the cycle ends.

Stream join is a fundamental operation for relating information from different streams. Referring again to the example described for FIG. 2, two streams of packets seen by network monitors placed at two routers can be joined on packet ids to identify the packets that flowed through both routers, and compute the time delta to reach these routers. Joining operations including input streams will now be described in more detail with reference to FIGS. 3a-c. FIGS. 3a-c illustrate example join operations.

Join a Stream Window and a Static Table.

Joining stream elements falling in a time window ($S_e$) and a relation (R) returns the set of all pairs <s, r>, where s∈$S_t$, r∈R, and the join condition θ(s, r) evaluates to true. FIG. 3a illustrates joining a table 300a with a chunk 300b from a buffered data stream 300c that can be re-scanned for returning the same data as the original scan.

It can be seen with reference to the previously described query ($Q_B$), that the input data stream generated by the SCF STREAM_get_packets( ) are joined with table hosts in the per-minute chunk to derive the host-to-host traffic volume on the minute basis. In each cycle, the chunk of data stream is bounded, and so the query ($Q_B$) can generate query results on a cycle-by-cycle basis. The join of a data stream chunk returned from STREAM_get_packets( ) with the hosts table, is the operation taking place in each query execution cycle with three nested loops, illustrated below:

---
for each tuple r in the chunk of the stream do
    for each tuple h1 in Hosts do
       for each tuple h2 in Hosts do
          if r and h1, h2 satisfy the join condition
             then output the tuple <r, h1, h2>.
---

It can be seen that re-scanning a table, such as the hosts table above, results in the same data content as the original scan. However, in case the SCF, STREAM_get_packets( ) is re-executed on the "re-scan" demand in an query execution cycle, the query should not read in a new data stream. Instead, the query should deliver the original chunk of data received in the current query execution cycle. Reading in a new data stream during re-scan is inconsistent with the semantics of re-scan and generates incorrect join results. However, this is unlikely in joining a stream with a static table, because the cardinality of a data stream source (represented by a SCF) is unknown. Instead, the query optimizer tends to re-scan the table with a known cardinality.

Window-Join Multiple Streams.

Stream join is an operation for relating information from different streams. Like relation join, stream-join is a stateful operation. In the time-based dataflow context, joining two streams chunk-wise is a block operation. That is, the operation takes place only after two chunks of data stream are received. In general, given two streams S and S' punctuated by the same chunking criterion, in each query execution cycle, the most recent chunks ($S_t$ and $S'_t$) are joined. The query execution cycle thus returns the set of all pairs <s, s'>, where s∈$S_t$, s'∈$S'_t$, and the join condition θ(s, s') evaluates to true. This can be seen in FIG. 3b, where only the most recent chunks of each stream are joined.

As mentioned above for function scan (the access method of stream query), nested loop join is the default system choice that potentially involves "re-scan a stream source". With non-data stream, re-scan always gets the same set of input data. With SCF, "scan" a stream source initially receives the newly incoming data stream, and "re-scan" returns the same data as the above initial scan. These two behaviors are automatically switchable during stream-join.

The above example can be extended by considering two streams of data packets ($S_1$ and $S_2$), seen by network monitors placed at two routers ($RT_1$ and $RT_2$). CCQ can be used to join the data streams in the minute based chunks, on packet IDs to identify those packets that flowed through both routers, and compute the average time for such packets to reach the two routers ($RT_1$ and $RT_2$).

The two streams have the same schema [pid, $t_s$, from-ip, to-ip, bytes, $t_{rt}$ ...], where $t_{rt}$ is the timestamp captured at the router, and the stream punctuation point is determined by the source timestamp ($t_s$), as follows:

---
[Cycle-based Continuous Query for Stream-Join : Qc]
---
SELECT floor($S_1.t_s$/60) AS minute, AVG($S_2.t_{rt}$ −$S_1.t_{rt}$) FROM
    STREAM_get_packets ($RT_1$, 'CUT ON $t_s$ BY 60 SECS',
    'BLOCK')) S1,
    STREAM_get_packets ($RT_2$, 'CUT ON $t_s$ BY 60 SECS',
    'BLOCK')) $S_2$,
    WHERE $S_1$.pid = $S_2$.pid GROUP BY minute.
---

The re-scan semantics are enforced by extending the buffer hierarchy and invocation pattern of the table functions serving as SCFs. This allows the data chunk read in each query execution cycle to be buffered and re-delivered in the subsequent "re-scans," which is indicated by the SCF's parameter 'BLOCK'.

In each query execution cycle, the SCF (as a table function) is called multiple times for returning multiple tuples generated from the received events. The associated buffer state is initiated at the beginning of the first call, and finalized (e.g., cleanup) at the end of the last call. These calls make up the multi-call-process of a function scan in the query execution cycle. In the initial function-scan, the SCF returns multiple tuples generated from the received stream elements to fuel the query; it takes place only once per query-cycle. If re-scan is needed in the subsequent function-scans, the SCF returns the buffered tuples.

To support this mechanism, two extensions are made to the query engine. One extension includes buffering SCF's input data across multiple function-scans in a cycle, as well as across multiple cycles. Another extension switches the SCF's behavior for delivering the initially captured data in the first scan and delivering the buffered data in all the subsequent re-scans.

To support re-scan and to distinguish the initial scan and the re-scan, a Boolean variable is provided with state retained across multiple function scan and re-scans in a query execution cycle. This variable is set during the initial scan, indicating "the initial scan has been done". For each function scan, if this variable is not set, the initial scan process is invoked for getting new data from the stream source. Otherwise, the re-scan process is invoked for delivering the already buffered data.

It is noted that the above example was described as a nested-loop join. However, this approach is also applicable to other join types.

Join Streams in Sliding-Windows.

In general, by adjusting the buffer boundary, join two streams on the chunk-based sliding windows with various pairing schemes is possible. Note that a chunk-based sliding window shifts chunk-by-chunk, and a chunk can be as small as a single tuple. By way of illustration, consider two streams S and S' captured by SCF and SCF', and commonly chunked by timestamp. SCF keeps a sliding window buffer for M data chunks of S, and SCF' holds N data chunks of S'. In each query execution cycle, join m≤M chunks, ($S_m$) is held in SCF, and n≤N chunks ($S'_n$) in SCF' returns the set of all pairs <s, s'>, where s∈$S_m$, S'n, and the join condition θ(s, s') evaluates to true.

In case M=1 or N=1, the joins are not overlapped between query execution cycles. Instead, the stream join takes place every query execution cycle. This is illustrated in FIG. 3b. FIG. 3b shows joining two streams 310a-b by pairing chunks 310c buffered in chunk-based sliding windows 310d. The buffered data chunks can be re-scanned. The CCQ ($Q_c$), described above, is a special (but frequently used) case where M=N=1.

Self-Join a Stream in a Sliding Window.

Self-joining different chunks (e.g., the most recent chunk and certain past chunks) of the same stream for correlation purposes in a sliding window, is useful in many applications. The problem can be described using the following example of a stream (S) and a sliding window ($S_w$) having the consecutive chunks of S, <$S_0$, $S_1$, ... $S_k$>, where $S_0$ is the most recent chunk. Joining $S_0$ with $S_w$ returns the set of all pairs <$s_0$, $s_w$>, where $s_0$∈$S_0$, $s_w$∈$S_w$, and the joining condition θ(s0, sw) evaluates to true.

This is conceptually shown in FIG. 3c. FIG. 3c shows joining the most recent chunk 320b with the previous chunks 320c of the same stream 320a maintained in a sliding window, by using two SCFs which buffer the stream differently.

By way of illustration, in telecommunication monitoring applications, a Call Detail Record (CDR) data stream often includes duplicate CDRs representing the same phone call, but generated by different probes with slightly different start-call timestamps ($t_s$), for example, 0.2 seconds delta. Identifying such duplicate CDRs can be treated as joining the CDR captured in a 5 second chunk with those captured in the past 1 minute (12 chunks), as expressed by the CCQ.

To fuel this query, the CDR stream may be split and fed in two SCF instances (e.g., SCF1 and SCF2), where both SCF instances chunk the input stream every 5 seconds by timestamp. SCF1 maintains the current chunk of data, and SCF2 continuously maintains a sliding window including 12 chunks (e.g., 1 minute) of data. The sliding window shifts chunk-by-chunk. In each 5 second cycle, the current chunk of data captured by SCF1 are joined with the 12 chunks of data kept in SCF2. Each new data chunk appears in SCF1 only once, and therefore will be joined with the data chunks held in SCF2 without being duplicated. Additional and/or other operations to eliminate the duplicates may also be implemented. This technique may be used, for example, to correlate the most recent data stream with the previous ones in a sliding window boundary.

Extending the Query Engine to Support SCF Re-Scan.

As described above, the query engine may be extended to support the cut-and-rewind approach for handling CCQ-based stream processing. In addition, user defined function (UDF) buffer management may also be supported to enable CCQ-based stream join. A UDF can be used to maintain a data buffer. A UDF may be called multiple times in a single host query, with respect to each input and output. Therefore, the life-span of the data buffer may be managed with respect to these invocations.

The input of scalar, aggregate, and/or table functions is bound to the attribute values of a single tuple, where an aggregate function may be implemented with an incremental, per-tuple calculation. A scalar or aggregate function is called multiple times, one for each input with a single return value (or a tuple as a composite value). A table function, however, can return a set out of a single input. Accordingly, on each input, the function may be called multiple times, one for each output. That is, the multi-call-process of a scalar/aggregate function spans over all the input tuples, but the multicall-process of a table function limits to one input only, while across multiple returns out of that single input.

The SCF is a table function with parameters bearing the chunking condition, stream source, etc. A function scan by a SCF is a multi-call-process. In each query cycle, there is an initial function scan, and possibly multiple subsequent re-scans.

The "top-level" data buffer of a table UDF is related to the multi-call-process, and thus only to a single function scan. To support stream join, the table function's data buffering may be extended across multiple function scans in a cycle for a chunk of data, and across multiple chunks. In addition, the table function's data buffering may be extended to the existing per-input/multi-returns data buffering in a single function scan. Therefore, the query engine and the Table UDF framework may be extended to allow the SCF to retain a data buffer across multiple function-scans with respect to the processing of one or more chunks of data.

In an example, a query may be parsed, optimized, and planned to form a query plan tree. To be executed, an instance of the query plan is initiated with nodes representing operators and their states. A UDF is represented by a function node that is the root of its function closure, where the information about the function, function-invocation, and the data buffers are provided. It is noted that the function node is external to the function (e.g., the UDF), and therefore the data linked to the function node may be sustained across multiple function calls.

Accordingly, the table UDF buffer management may be extended as follows. A data structure is extended under the function node with an additional pointer, and a new buffer allocated under the pointer. The life-span of this buffer sustains across multiple function-scans. Multi-layers of buffers (or memory context) is supported across multiple chunks, per-chunk, per-input tuple (e.g., per-scan with multi-returns), and per-return. In addition, the scope and time of memory de-allocation may be controlled in terms of system internal utilities (e.g. after a returned tuple, a function-scan, or the whole query has been processed).

Accordingly, new APIs for creating data buffer with per-query, per-chunk and per-scan initial states can be distinguished. In general, the buffers of the UDF at all levels are linked to the system handle for function invocation, and accessible through system APIs.

Figure 4:
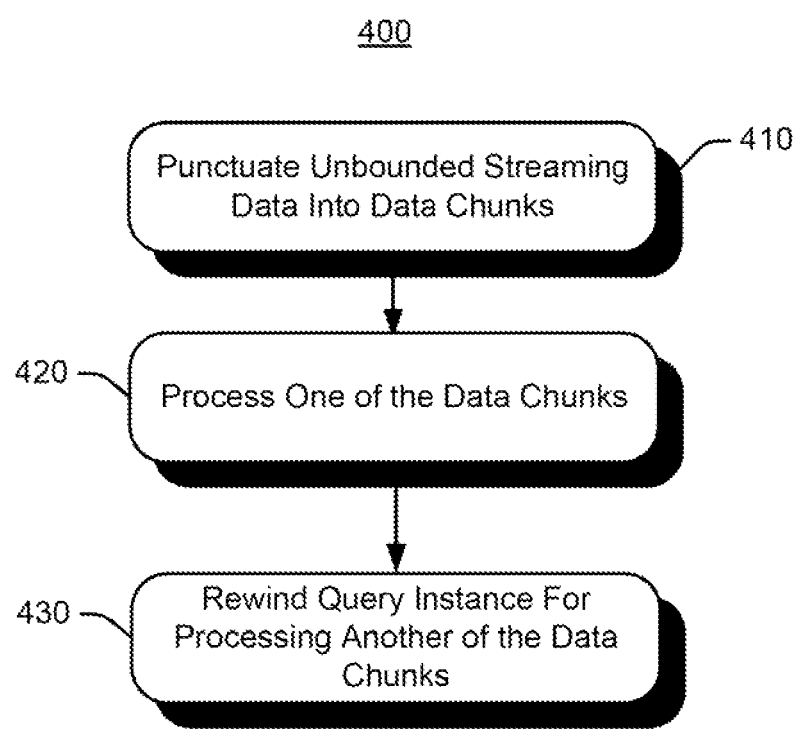
FIG. 4 is a flowchart illustrating example operations which may be implemented for multi-stream analytics.

FIG. 4 is a flowchart illustrating example operations which may be implemented for multi-stream analytics. Operations 400 may be embodied as logic instructions on one or more computer-readable medium. When executed on a processor, the logic instructions cause a general purpose computing device to be programmed as a special-purpose machine that implements the described operations. In an example, the operations may be implemented using a query engine.

Operation 410 includes punctuating unbounded streaming data into data chunks, each of the data chunks representing a bounded data set in the unbounded streaming data. Operation 420 includes processing one of the data chunks. Operation 430 includes rewinding a query instance for processing another of the data chunks. In an example, the operations may include executing a sequence of query cycles on a sequence of data chunks. Also in an example, the query may use the structured query language (SQL).

The operations shown and described herein are provided to illustrate example implementations. It is noted that the operations are not limited to the ordering shown. Still other operations may also be implemented.

Still further operations may include joining multiple input streams, joining a stream window and a static table, window-joining multiple input streams, joining streams in sliding windows, and self-joining a stream in a sliding window. Each of these operations has already been described in more detail above, and therefore the description is not repeated again here.

The operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method of multi-stream analytics with a query engine, comprising:
    punctuating unbounded streaming data into data chunks, each of the data chunks representing a bounded data set in the unbounded streaming data;
    processing one of the data chunks,
    cutting query execution based on cycle specification; and
    rewinding a state of a query instance without shutting down the query instance between execution cycles for processing another of the data chunks in a next execution cycle.

2. The method of claim 1, further comprising executing a sequence of query cycles on a cycle-by-cycle basis on a sequence of the data chunks in a chunk-by-chunk manner.

3. The method of claim 1, further comprising joining multiple streams and self-joining a single stream using a data chunk-based window or sliding window, wherein self-joining, joins a most recent chunk and a predetermined past chunk.

4. The method of claim 1, further comprising joining multiple input streams by buffering consecutive data chunks in a sliding window.

5. The method of claim 1, further comprising joining a stream window and a static table.

6. The method of claim 1, further comprising window-joining multiple input streams.

7. The method of claim 1, further comprising joining streams in sliding windows.

8. The method of claim 1, further comprising self-joining a stream in a sliding window.

9. The method of claim 1, wherein the query uses structured query language (SQL).

10. The method of claim 1, further comprising when an end-of-cycle event is signaled from a stream capture function (SCF), the query engine completes a current query execution cycle and then rewinds the query instance for the next execution cycle.

11. The method of claim 10, wherein the end-of-cycle event is determined when a first stream element belonging to the next execution cycle is received.

12. The method of claim 11, wherein the query instance remains active even after the end-of-cycle event.

13. The method of claim 12, further comprising discarding intermediate results of SQL operators associated with a current chunk of data, and maintaining application context at the end-of-cycle event.

14. The method of claim 1, further comprising maintaining continuity of the query instance for retaining the buffered data for history-sensitive applications.

15. A system having a query engine executing program code for multi-stream analytics, the program code stored on a non-transient computer readable medium and executed to:
punctuate unbounded streaming data into data chunks representing bounded data sets;
cutting query execution based on a cut point specified in cycle specification; and
execute a query instance on one of the data chunks, and then rewind a state of the query instance without shutting down the query instance between execution cycles for processing another of the data chunks in a next cycle; and
execute a sequence of query cycles on a sequence of the data chunks.

16. The system of claim 15, wherein the program code is further executed to join multiple streams and self-join a single stream using a data chunk-based window or sliding window.

17. The system of claim 15, wherein the program code is further executed to join multiple input streams.

18. The system of claim 15, wherein the program code is further executed to join a stream window and a static table.

19. The system of claim 15, wherein the program code is further executed to join streams in sliding windows.

20. The system of claim 15, wherein the program code is further executed to self-join a stream in a sliding window.

* * * * *

UNITED STATES PATENT AND TRADEMARK OFFICE
CERTIFICATE OF CORRECTION

PATENT NO. : 8,880,493 B2  
APPLICATION NO. : 13/246947  
DATED : November 4, 2014  
INVENTOR(S) : Qiming Chen et al.

Page 1 of 1

It is certified that error appears in the above-identified patent and that said Letters Patent is hereby corrected as shown below:

In the Claims

In column 10, line 37, in Claim 1, delete "chunks," and insert -- chunks; --, therefor.

In column 10, lines 47-48, in Claim 3, delete "self-joining," and insert -- self-joining --, therefor.

Signed and Sealed this  
Fourteenth Day of April, 2015

Michelle K. Lee  
*Director of the United States Patent and Trademark Office*